No. 866,127. PATENTED SEPT. 17, 1907.
M. D. GLASSBROOKE.
HORSESHOE PAD.
APPLICATION FILED AUG. 13, 1904.

Witnesses

Inventor
Myron D. Glassbrooke
by D. A. Gourick
Attorney

UNITED STATES PATENT OFFICE.

MYRON D. GLASSBROOKE, OF ANGOLA, INDIANA.

HORSESHOE-PAD.

No. 866,127.  Specification of Letters Patent.  Patented Sept. 17, 1907.

Application filed August 13, 1904. Serial No. 220,681.

*To all whom it may concern:*

Be it known that I, MYRON D. GLASSBROOKE, a citizen of the United States, residing at Angola, in the county of Steuben and State of Indiana, have invented certain new and useful Improvements in Horseshoe-Pads, of which the following is a specification.

My invention relates to pads for horse-shoes and has for its object the provision of a pad, made of elastic material, having a tread portion at the heel that projects beyond the heel of the shoe and with wing like diaphragms to be secured between the shoe and bottom of the hoof. Above the tread portion is provided a projection that rests in the crease of the frog so that when the weight of the animal is on the foot it presses the frog upwardly and outwardly and gives the frog the same action that it does when the animal is barefooted and traveling on soft ground. I also secure a layer of fabric such as duck or canvas on the top of the pad which may be saturated with an antiseptic solution to cure any soreness or disease of the hoof or frog.

The construction and advantages of my invention will be fully explained hereafter and understood from an inspection of the drawings in which.

Figure 1:
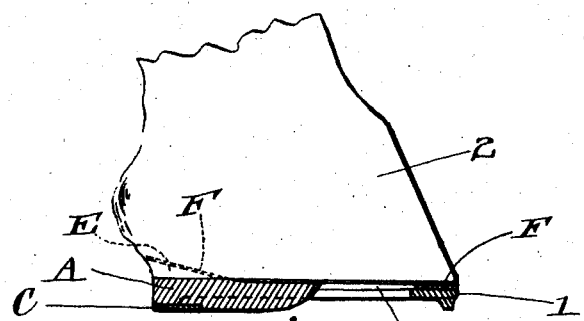
Figure 2:
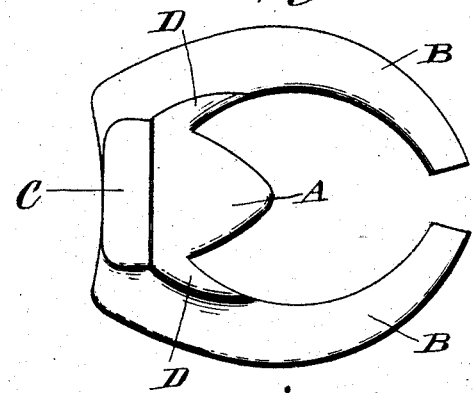
Figure 3:
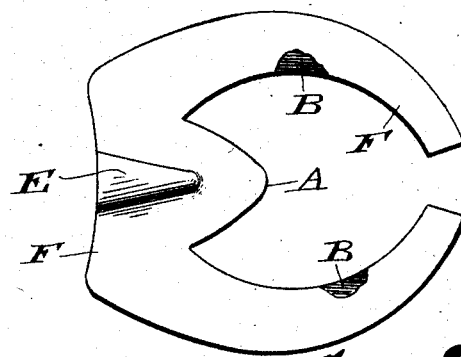

Figure 1 is a side view of a horse's hoof partly broken away and showing my device in position between the shoe and hoof. Fig. 2, a view of the tread side of the pad, and Fig. 3, a view of the side of the pad that rests against the hoof.

In the drawings similar reference characters indicate corresponding parts throughout the several views.

A represents the tread portion of my improved hoof pad which is preferably made of a shield shape, as shown.

B represents wings made integral with the tread-portion A and relatively thin so as to be secured between shoe 1 and the hoof 2, as shown in Fig. 1.

The tread portion A and wings B are made of hard rubber or other elastic material.

C represents a wear plate made of metal secured to the tread side of the part A.

D represents strengthening braces made integral with the tread portion A and wings B.

E represents a protuberance on the upper side of the pad and above the rear of the tread portion A, said protuberance being adapted to fit in the crease in the frog and, when the weight of the animal is on the tread portion A, said protuberance presses the frog upward and outward so that it is given the same action as in its natural state.

F represents a covering of canvas or other suitable fabric to prevent any deleterious effect of the rubber on the hoof as well as to receive any desired antiseptic or medical preparation for the cure of disease or soreness in the hoof or frog.

In applying my invention the hoof is first prepared for the reception of the shoe as in ordinary cases. The pad is then placed in position and the shoe secured through the wings B to the hoof.

Having thus described my invention what I claim is—

1. A horseshoe pad comprising a thick tread portion adapted to fit between the two heel ends of a horseshoe, said tread portion being substantially shield-shape in outline with its point towards the toe of the shoe, relatively thin curved wings projecting from the upper edge of said tread portion and adapted to be secured between the horseshoe and the hoof, and a protuberance on the top of the tread portion to fit into the hoof frog, substantially as shown and described.

2. A horseshoe pad comprising a thick tread portion and relatively thin curved wings projecting from the upper edge of said tread portion made of yielding material, the tread portion being shield-shape in outline and adapted to seat between the two heel ends of a horseshoe with its point towards the toe of the shoe, a wear plate of rigid material secured to the wear side of the tread portion, and a protuberance on the top of the tread portion to fit in the crease in the hoof frog, substantially as shown and described.

In testimony whereof I hereto affix my signature in the presence of two witnesses.

MYRON D. GLASSBROOKE.

Witnesses:
THAD. K. MILLER,
FRED SWIFT.